United States Patent
Tseng et al.

(10) Patent No.: US 8,922,900 B2
(45) Date of Patent: Dec. 30, 2014

(54) OPTICAL ELEMENT STRUCTURE AND OPTICAL ELEMENT FABRICATING PROCESS FOR THE SAME

(71) Applicant: Taiwan Semiconductor Manufacturing Company, Ltd., Hsinchu (TW)

(72) Inventors: Chun-Hao Tseng, Taichung (TW); Ying-Hao Kuo, Hsinchu (TW); Hai-Ching Chen, Hsinchu (TW); Tien-I Bao, Taoyuan County (TW)

(73) Assignee: Taiwan Semiconductor Manufacturing Company Ltd., Hsinchu (TW)

( * ) Notice: Subject to any disclaimer, the term of this patent is extended or adjusted under 35 U.S.C. 154(b) by 0 days.

(21) Appl. No.: 13/747,394

(22) Filed: Jan. 22, 2013

(65) Prior Publication Data
US 2014/0204466 A1 Jul. 24, 2014

(51) Int. Cl.
*B05D 5/06* (2006.01)
*G02B 3/00* (2006.01)

(52) U.S. Cl.
CPC ... *B05D 5/06* (2013.01); *G02B 3/00* (2013.01)
USPC ....... 359/642; 427/162; 427/163.3; 427/96.1; 216/24; 430/321

(58) Field of Classification Search
CPC .................. B29D 11/00278; B29D 11/00365; G02B 3/0012; G02B 3/0018; G02B 3/0043; H01L 27/14685; H01L 27/14627
USPC ........... 257/432; 264/1.1, 1.32, 1.38, 2.2, 2.6, 264/2.7; 348/340; 359/620, 626, 642; 438/29
See application file for complete search history.

(56) References Cited

U.S. PATENT DOCUMENTS

| | | | |
|---|---|---|---|
| 6,653,705 B2 * | 11/2003 | Ushijima et al. | 257/432 |
| 7,012,754 B2 * | 3/2006 | Boettiger et al. | 359/626 |
| 7,097,778 B2 * | 8/2006 | Ho et al. | 216/26 |
| 8,120,856 B2 * | 2/2012 | Mak et al. | 359/619 |

* cited by examiner

*Primary Examiner* — David N Spector
(74) *Attorney, Agent, or Firm* — McDermott Will & Emery LLP

(57) ABSTRACT

An optical element structure and a fabricating process for the same are provided. The optical element fabricating process includes providing a substrate forming thereon a protrusion; and forming an over coating layer over the protrusion and the substrate by a deposition scheme to form an optical element.

20 Claims, 9 Drawing Sheets

OPTICAL ELEMENT STRUCTURE AND OPTICAL ELEMENT FABRICATING PROCESS FOR THE SAME

FIELD

The present disclosure relates to a semiconductor structure and a fabricating process for the same. More particularly, it relates to a semiconductor structure having an optical element structure formed thereon and an optical element fabricating process for forming the optical element structure.

BACKGROUND

Microlens is widely employed in a variety of fields, such as micro-electro-mechanical systems (MEMS), image sensors including charged coupling device (CCD) image sensors, complimentary metal-oxide-semiconductor (CMOS) image sensors, photoelectric and photonic devices and so on.

In general, a microlens is utilized to guide the light to the photosensitive component, and typically acts as a focusing element. A microlens is a tiny lens formed on a semiconductor substrate above a photosensitive component. Because the light passes through the microlens, it is important that the microlens is shaped accurately for guiding the light on the photosensitive component. In some examples, the microlens transforms a light pattern into an electric charge pattern.

Microlens is generally formed by a hard molding method. However, the hard molding method is difficult for fabricating small microlens patterns and keeping the same uniformity across a large area.

Another method involves a photo-patternable polymer and a thermal reflow process. Microlens is often formed by patterning a polymer layer formed over a color filter or a photosensitive component, a dielectric layer, or other substrate features. A thermal reflow process is subsequently performed to heat the patterned polymer for a deformation which creates a desired shape of the microlens thereby. In some example, each microlens is aligned over the corresponding image sensors formed in the underlying substrate. Consequently, the incident light on each microlens is focused towards the corresponding image sensors. In such process, the curvature of microlens is fixed and limited by the property of the polymer and the required process temperature for the reflow step is high.

Nevertheless, a concerned issue incurred during the fabrication of the microlens as the design sizes are reduced. For example, as the design size is reduced, the microlens is positioned closer together. As the microlens is positioned closer together, the microlens has a tendency to merge during the thermal reflow procedure. The reflow procedure employed in high temperatures is difficult to control and also difficult to prevent the microlens from merging as the distance between microlens shortens.

Another concerned issue is related to the focal length. The thickness of the device will increase due to the additional layers as more circuitry is integrated onto a semiconductor chip. Because the additional layers increase the focal length, a thinner microlens is required consequently. The thermal reflow process for creating thinner microlens generally uses a much higher temperature and it leads to increasing possibilities of the microlens merging.

There is another concerned issue in optical interconnections and optical waveguides. The fabricating processes of an optical waveguide are facing problems similar to those for fabricating a microlens. In some example, an extra microlens is required to be configured to utilize the optical waveguide.

There is a need to solve the above deficiencies/issues.

SUMMARY

In an optical element fabricating process for forming an optical element includes forming a substrate, a set of block structures and an over coating layer. The set of block structures is formed on the substrate, each of which structure has a controllable aspect ratio. The over coating is formed over the set of block structures and the substrate by a deposition scheme to form the optical element according to the aspect ratio.

In an optical element structure, the structure includes a substrate, a set of block structures and a curved layer. The set of block structures is formed on the substrate. The curved layer is formed over the set of block structures and the substrate.

In an optical element structure for forming an optical element, the structure includes a substrate, a protrusion and an over coating layer. The protrusion is formed on the substrate. The over coating layer is formed over the protrusion and the substrate.

The present disclosure may best be understood through the following descriptions with reference to the accompanying drawings, in which:

DETAILED DESCRIPTION

Figure 1:
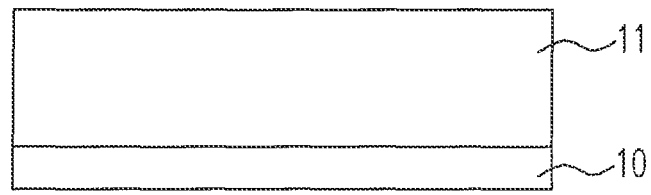
FIG. 1 is a schematic diagram illustrating an initial structure in the semiconductor structure fabricated in accordance with the present disclosure

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

A deposition scheme involved in the present disclosure may refer to one selected from a group consisting of a spin-on coating scheme, an electroplating scheme, an atomic layer deposition scheme, a physical-based vapor deposition scheme, a chemical-based vapor deposition scheme, a conformal deposition scheme, a non-conformal deposition scheme and a combination thereof. An etch scheme, for example, a partial etch scheme, a main etch scheme or an etchback scheme, involved in the present disclosure may refer to one selected form a group consisting of a dry etch scheme, a wet etch scheme, an isotropic etch scheme, an non-isotropic etch scheme and a combination thereof A polishing scheme involved in the present disclosure may refer to a chemical mechanical polishing scheme.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

Referring now to FIGS. 1 to 10, a first embodiment in accordance with the present disclosure with a series of transitional structures of a microlens for a semiconductor fabricating process is shown. FIG. 1 is a schematic diagram illustrating an initial structure in the semiconductor structure fabricated in accordance with the present disclosure. In FIG. 1, an initial structure includes a substrate 10 and a transparent layer 11. The transparent layer 11 is formed on the substrate 10 by a known deposition scheme, such as a spin-on coating scheme, an ALD scheme, a vapor-based deposition scheme and so on. The substrate 10 includes a material being a glass, a resin, a color filter and a wafer or the like.

Figure 2:
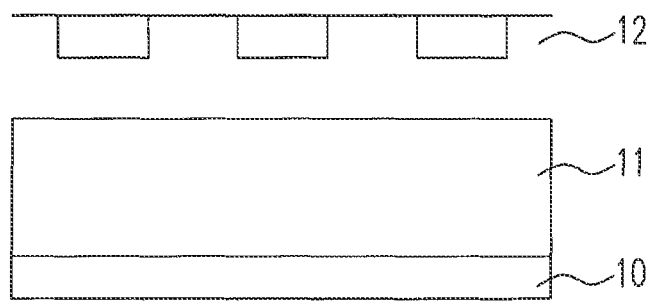
FIG. 2 is a schematic diagram illustrating a photolithographic process performed in the semiconductor structure in accordance with the present disclosure.

FIG. 2 is a schematic diagram illustrating a photolithographic process performed in the semiconductor structure in accordance with the present disclosure. In FIG. 2, the transparent layer 11 is patterned by implementing a photolithographic scheme in cooperation with a photomask 12 carried with a predetermined pattern, wherein a soft bake (also referred to as a pre-bake) approach is performed on the transparent layer 11 and then an exposure approach is employed thereon. The transparent layer 11 is a photosensitive polymeric material, a photosensitive spin-on-dielectric material or the like.

Figure 3:
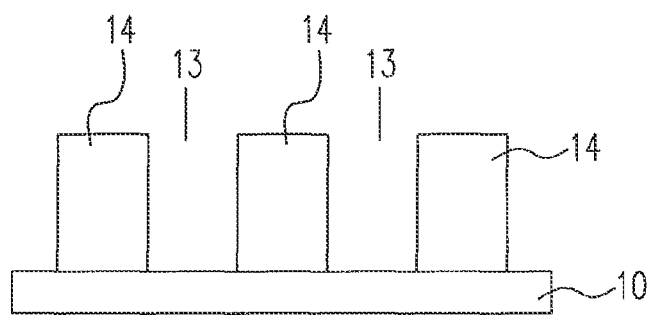
FIG. 3 is a schematic diagram illustrating a set of block structures in the semiconductor structure fabricated in accordance with the present disclosure.

FIG. 3 is a schematic diagram illustrating a set of block structures in the semiconductor structure fabricated in accordance with the present disclosure. In FIG. 3, there is a plurality of trenches 13 formed on the substrate 10 by implementing a developing process, and correspondingly the transparent layer 11 is transformed to a set of block structures 14 (also referred to as a set of protrusions).

Figure 4:
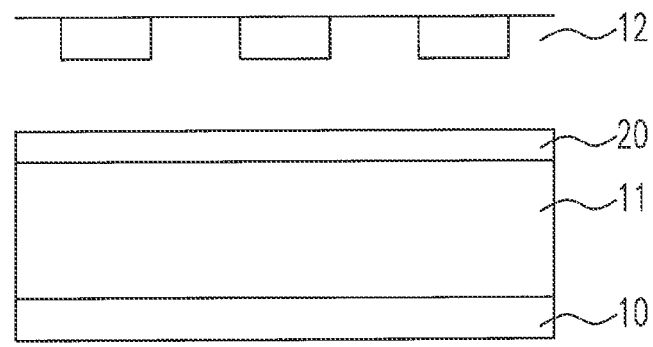
FIG. 4 is a schematic diagram illustrating a photoresist layer in the semiconductor structure fabricated in accordance with the present disclosure.

FIG. 4 is a schematic diagram illustrating a photoresist layer in the semiconductor structure fabricated in accordance with the present disclosure. In some embodiments, the transparent layer 11 is made of a material without photosensitivity. Hence, a photoresist layer 20 is formed on the transparent layer 11 by a deposition process and the photolithographic scheme is implemented with the photomask 12 to transfer the predetermined pattern on the photoresist layer 20 as shown in FIG. 4.

Figure 5:
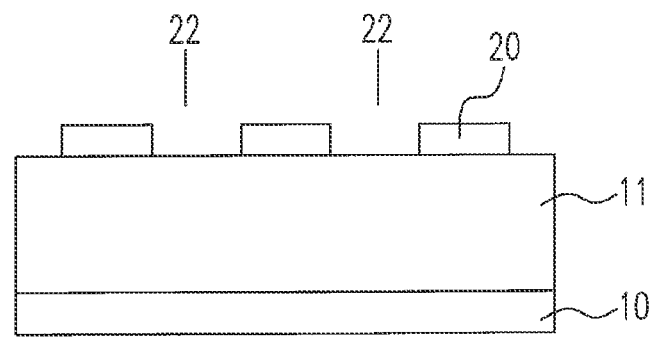
FIGS. 5 to 7 are schematic diagrams illustrating an etching process performed in the semiconductor structure in accordance with the present disclosure.
Figure 6:
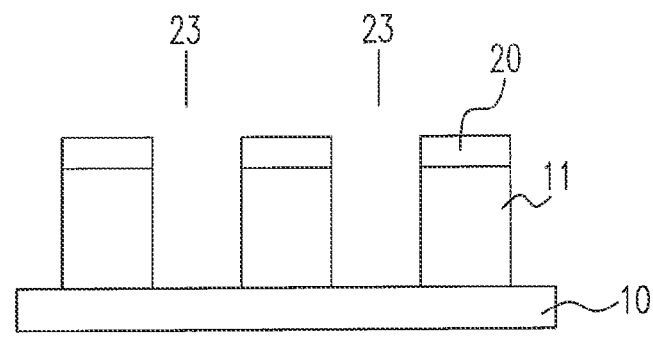
Figure 7:
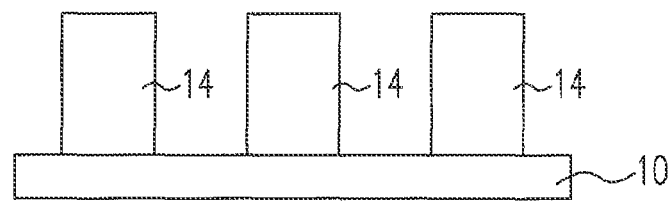

FIGS. 5 to 7 are schematic diagrams illustrating an etching process performed in the semiconductor structure in accordance with the present disclosure. In FIG. 5, a predetermined unwanted portion of the photoresist layer 20 is removed by a developing process, so as to form a plurality of openings 22. In FIG. 6, the plurality of openings 22 are further deepened downwardly to a level which is coplanar with the substrate 10. In FIG. 7, the residual portions of the photoresist layer 20 are subsequently removed by a stripping process, so as to form the set of block structures 14 which is the same with the set of block structures 14 in FIG. 3.

Figure 8:
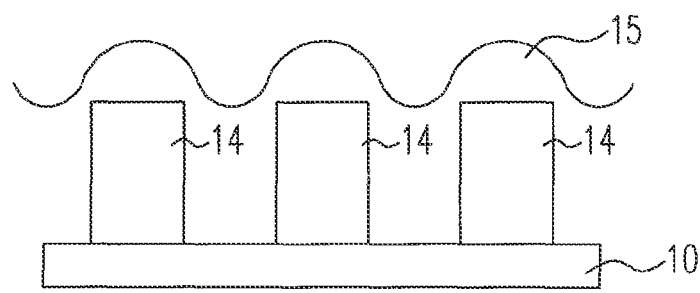
FIG. 8 is a schematic diagram illustrating an over coating layer in the semiconductor structure fabricated in accordance with the present disclosure.

FIG. 8 is a schematic diagram illustrating an over coating layer in the semiconductor structure fabricated in accordance with the present disclosure. In FIG. 8, in order to form a transparent curved layer 15 over the set of block structures 14 and the substrate 10, a depositing scheme in particular a spin-on coating process is subsequently implemented. The transparent curved layer 15 is made of a polymeric material, a spin-on-dielectric material (SOD) or a material which can be applied to the spin-on coating process, and it is applicable to use the same material in the set of block structures 14 and the transparent curved layer 15.

The transparent curved layer functioned as wave-absorbent material via incorporated metal nano-particles, semiconductor nano-particles or the like. Hence, the transparent curved layer 15 is able to serve as a color filter layer.

Figure 9:
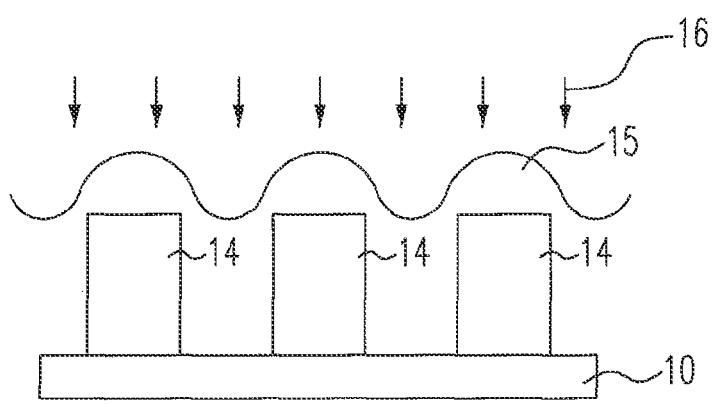
FIG. 9 is a schematic diagram illustrating a heat treatment in the semiconductor structure fabricated in accordance with the present disclosure.

FIG. 9 is a schematic diagram illustrating a heat treatment in the semiconductor structure fabricated in accordance with the present disclosure. In FIG. 9, a baking process is performed on the transparent curved layer 15 to evaporate residue solvent and settle shapes of the transparent curved layer 15, so as to form a set of microlens 17. In order to harden the transparent curved layer 15, a surface treatment 16 is implemented, such as an ultraviolet (UV) curing treatment, a de-scum treatment, a bleach treatment, a chemical solvent treatment and so on. In some embodiments, the baking process is performed up to 100 Centigrade degrees.

For example, the UV curing treatment is performed by irradiating the set of microlens 17 with a UV light from a UV source and the bleach treatment is performed by exposing the set of microlens 17 in a stepper. The chemical solvent treatment is performed by treating the surfaces of the set of microlens 17 with N-Methyl-2-Pyrrolidone (NMP) and acetone. The de-scum treatment is performed by treating the surfaces of the set of microlens 17 with an oxygen plasma.

Figure 10:
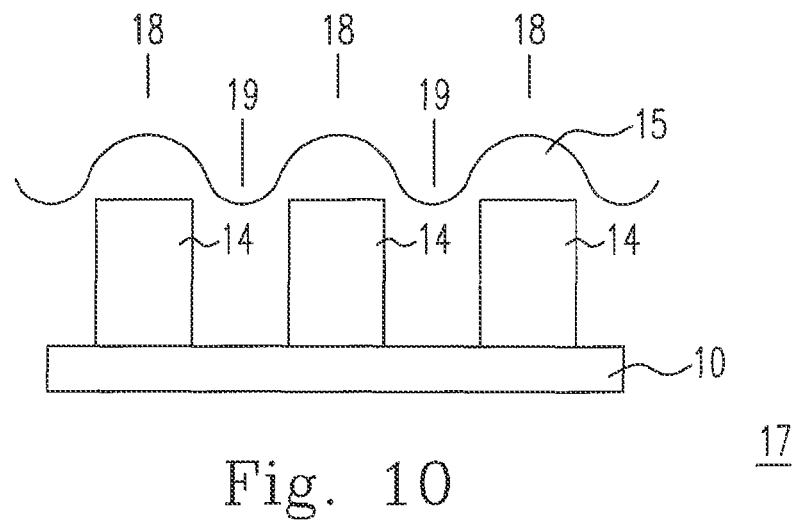
FIG. 10 is a schematic diagram illustrating a microlens array in the semiconductor structure fabricated in accordance with the present disclosure.

FIG. 10 is a schematic diagram illustrating a microlens array in the semiconductor structure fabricated in accordance with the present disclosure. In FIG. 10, the configuration of the set of microlens 17 includes the substrate 10, a set of block structures 14 formed on the substrate 10 and the transparent curved layer 15 on the top. There are both a convex portion 18 and a concave portion 19 of the transparent curved layer 15, and the two portions have radii of curvature respectively. Subsequently, the radius of curvature is controlled by a plurality of parameters. The parameters includes an aspect ratio of one structure of the set of block structures 14 and a spacing between the set of block structures 14, a viscosity of the material of the transparent curved layer 15 and a speed of the spin-on coating scheme.

In order to utilize the set of microlens 17, a refractive index between the set of block structure 14 and the transparent curved layer 15 should be less than 0.3 and measured at a wavelength in a range from 300 nm to 800 nm and it is applicable to use same materials in the set of block structures 14 and the transparent curved layer 15 for the maximal transition and least scattering.

Figure 11:
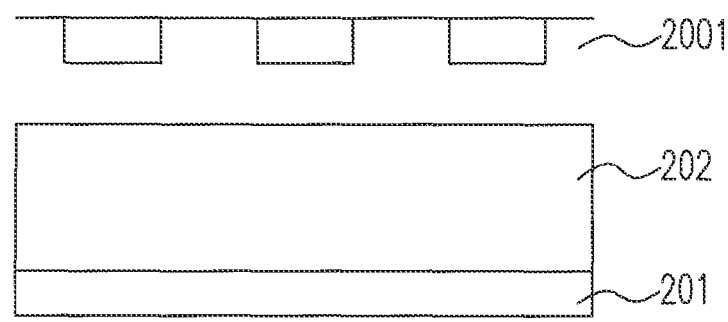
FIG. 11 is a schematic diagram illustrating a photolithographic process performed in the semiconductor structure in accordance with the present disclosure

Referring now to FIGS. 11 to 23, a second embodiment in accordance with the present disclosure is shown with a series of transitional structures of a waveguide for a semiconductor fabricating process. FIG. 11 is a schematic diagram illustrating a photolithographic process performed in the semiconductor structure in accordance with the present disclosure. In FIG. 11, an initial structure includes a substrate 201 and a layer 202. The layer 202 is formed on the substrate 201 by a known deposition scheme, such as a spin-on coating scheme, an ALD scheme, a vapor-based deposition scheme and so on. The substrate 201 includes one selected from a group consisting of a cladding, a printed circuit board, a mirror, a under bump metallurgy, a glass, a resin, a semiconductor wafer or the like. The layer 202 is patterned by implementing a photolithographic scheme in cooperation with a first photomask 2001 carried with a predetermined pattern, wherein the first photomask 2001 is a grey scale mask, a soft bake (also referred to as a pre-bake) approach is performed on the layer 202 and then an exposure approach is employed thereon. The layer 202 includes a photosensitive polymeric material, a photosensitive spin-on-dielectric material or the like.

Figure 12:
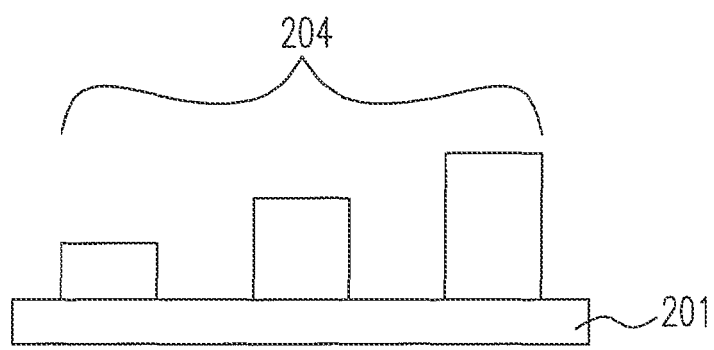
FIG. 12 is a schematic diagram illustrating a set of block structures in the semiconductor structure fabricated in accordance with the present disclosure.

FIG. 12 is a schematic diagram illustrating a set of block structures in the semiconductor structure fabricated in accordance with the present disclosure. In FIG. 12, due to the effect of the grey scale mask, the layer 202 is transformed to a set of block structures 204 with different aspect ratios by a developing process, wherein the aspect ratios are descending. The set of block structures 204 includes a material being one selected from a group consisting of an allyic resin, an acrylic resin, an epoxy resin, a benzocyclobutene, a fluoropolyimide, an SiOxNy, a spin-on-dielectric material or the like.

Figure 13:
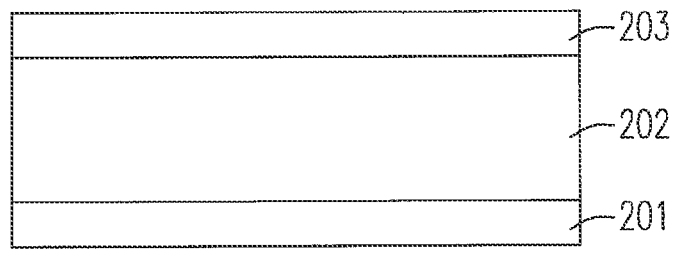
FIG. 13 is a schematic diagram illustrating a photoresist layer in the semiconductor structure fabricated in accordance with the present disclosure.

FIG. 13 is a schematic diagram illustrating a photoresist layer in the semiconductor structure fabricated in accordance with the present disclosure. In some embodiments, the set of block structures 204 is formed by an etching scheme. A photoresist layer 203 is formed on the layer 202 by a deposition process as shown in FIG. 13.

Figure 14:
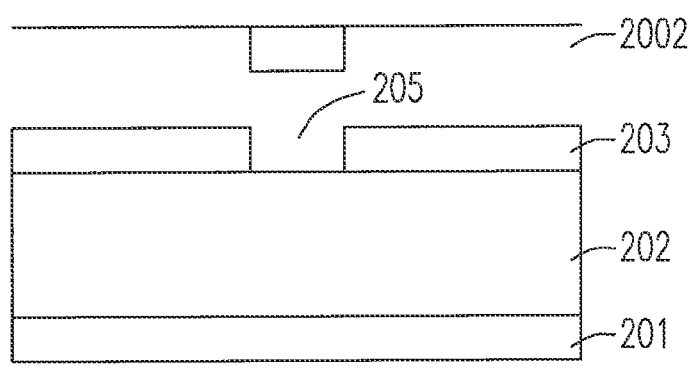
FIGS. 14 to 15 are schematic diagrams illustrating an etching process performed in the semiconductor structure in accordance with the present disclosure.
Figure 15:
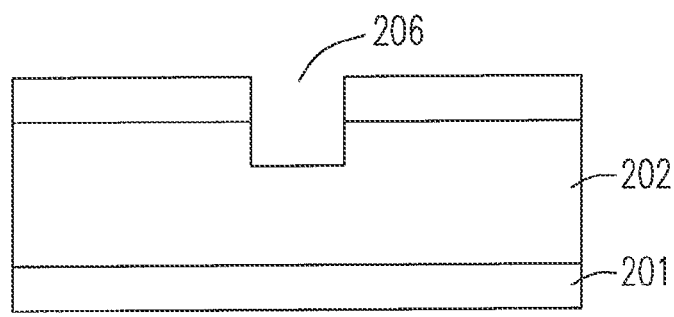

FIGS. 14 to 15 are schematic diagrams illustrating an etching process performed in the semiconductor structure in accordance with the present disclosure. In FIG. 14, a photolithographic scheme is implemented with a second photomask 2002 carried with a predetermined pattern and then a predetermined unwanted portion of the photoresist layer 203 is removed by a developing process, so as to form a first recess 205. In FIG. 15, the first recess 205 is further deepened downwardly to a predetermined depth to form a first via 206 by an etching process.

Figure 16:
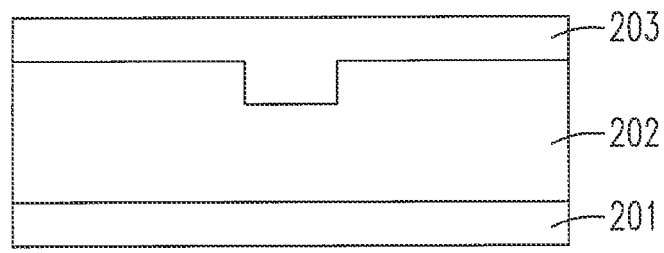
FIG. 16 is a schematic diagram illustrating a deposition process in the semiconductor structure fabricated in accordance with the present disclosure.

FIG. 16 is a schematic diagram illustrating a deposition process in the semiconductor structure fabricated in accordance with the present disclosure. In FIG. 16, a deposition process is performed to fill the first via 206 to a level that is coplanar with the photoresist layer 203.

Figure 17:
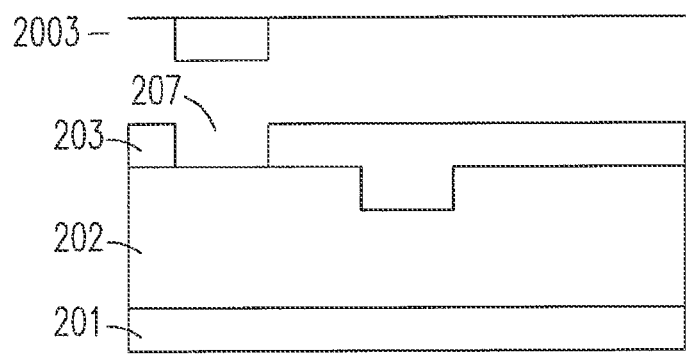
FIGS. 17 to 18 are schematic diagrams illustrating an etching process performed in the semiconductor structure in accordance with the present disclosure.
Figure 18:
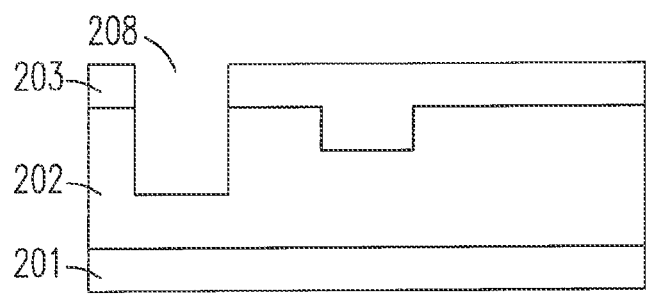

FIGS. 17 to 18 are schematic diagrams illustrating an etching process performed in the semiconductor structure in accordance with the present disclosure. In FIG. 17, a third photomask 2003 is implemented to transfer a desired pattern on the photoresist layer 203 by a photolithographic scheme. A developing process is performed to have a second recess 206 with the desired pattern. In FIG. 18, the second recess 207 is further deepened downwardly to a predetermined depth to form a second via 208 by an etching process.

Figure 19:
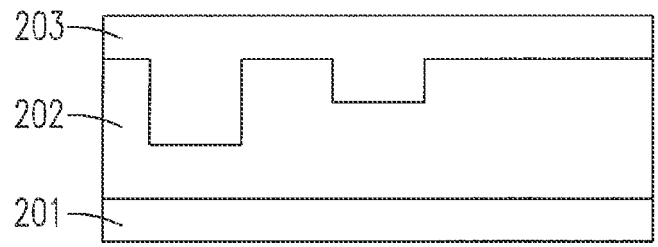
FIG. 19 is a schematic diagram illustrating a deposition process in the semiconductor structure fabricated in accordance with the present disclosure.

FIG. 19 is a schematic diagram illustrating a deposition process in the semiconductor structure fabricated in accordance with the present disclosure. In FIG. 19, a deposition process is performed to fill the second via 208 to a level that is coplanar with the photoresist layer 203.

Figure 20:
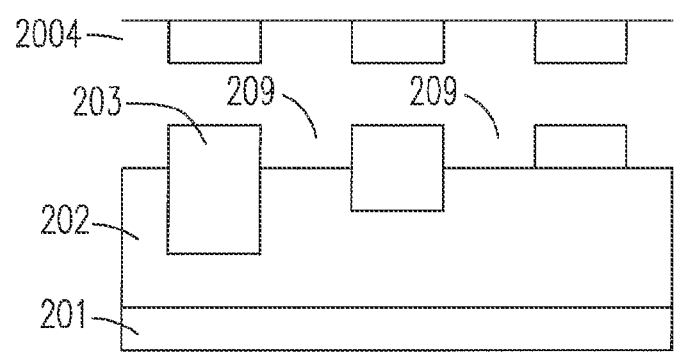
FIG. 20 is a schematic diagram illustrating a developing process in the semiconductor structure fabricated in accordance with the present disclosure.

FIG. 20 is a schematic diagram illustrating a developing process in the semiconductor structure fabricated in accordance with the present disclosure. In FIG. 20, a forth photomask 2004 is implemented to transfer a desired pattern on the photoresist layer 203 by a photolithographic scheme. A developing process is performed to remove the desired pattern of the photoresist layer 203, so as to form a plurality of recesses 209.

Figure 21:
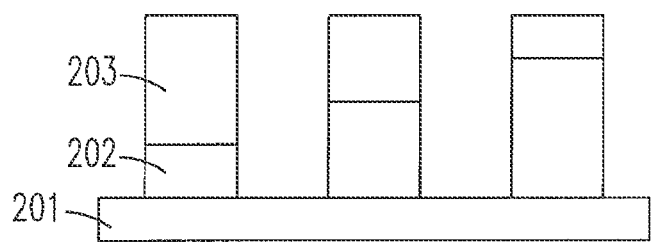
FIG. 21 is a schematic diagram illustrating an etching process in the semiconductor structure fabricated in accordance with the present disclosure.

FIG. 21 is a schematic diagram illustrating an etching process in the semiconductor structure fabricated in accordance with the present disclosure. In FIG. 21, the plurality of recesses 209 are further deepened downwardly form a plurality of vias 210 that penetrate to a level which is coplanar with the substrate 201 by an etching process.

Figure 22:
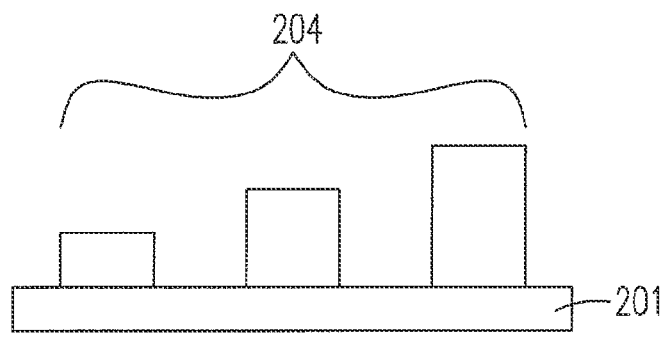
FIG. 22 is a schematic diagram illustrating a set of block structures in the semiconductor structure fabricated in accordance with the present disclosure.

FIG. 22 is a schematic diagram illustrating a set of block structures in the semiconductor structure fabricated in accordance with the present disclosure. In FIG. 22, in order to form the set of block structures 204, the residual portions of the photoresist layer 203 are subsequently removed by a stripping process.

Figure 23:
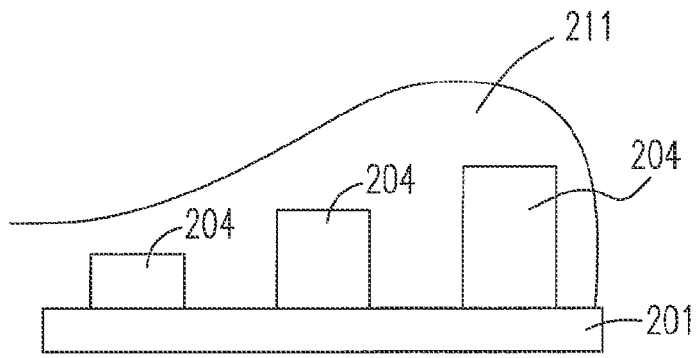
FIGS. 23 to 24 are schematic diagrams illustrating a waveguide in the semiconductor structure fabricated in accordance with the present disclosure.
Figure 24:
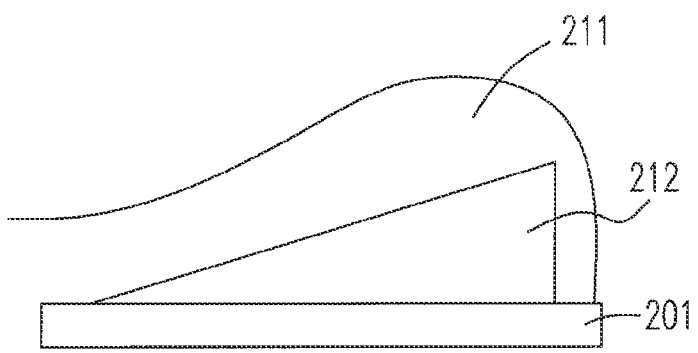

FIGS. 23 to 24 are schematic diagrams illustrating a waveguide in the semiconductor structure fabricated in accordance with the present disclosure. In FIG. 23, in order to form a waveguide 300, an over coating layer 211 is formed over the set of block structures 204 and the substrate 201 by a depositing scheme in particular a spin-on coating process. The over coating layer 211 is made of a cladding, a polymeric material, a spin-on-dielectric material (SOD) or a material which can be applied to the spin-on coating process, and it is applicable to use the same material in the set of block structures 204 and the over coating layer 211. In some embodiments, the over coating layer 211 is formed on an angled sidewall 212 which is formed by an etching process such as a wet-etching process, so as to form the waveguide 300 as shown in FIG. 24. In some embodiments, the waveguide 300 is an integral whole converging light having a tapered shape with a slope measured in 20 degrees.

In the aforementioned process, the shape and the property of the optical element are highly adjustable by a plurality of parameters. A first parameter is an aspect ratio of each structure, wherein the aspect ratio is controllable in a photolithographic process or an etching process. Hence, the microlens or the waveguide can be fabricated by a variation of the aspect ratios. The other parameters are a density of the set of block strucutres, a spin-speed of a spin-on coating process, a viscosity of the over coating layer, an interfacial property between the over coating layer and the set of block strucutres, and so on.

Figure 25:
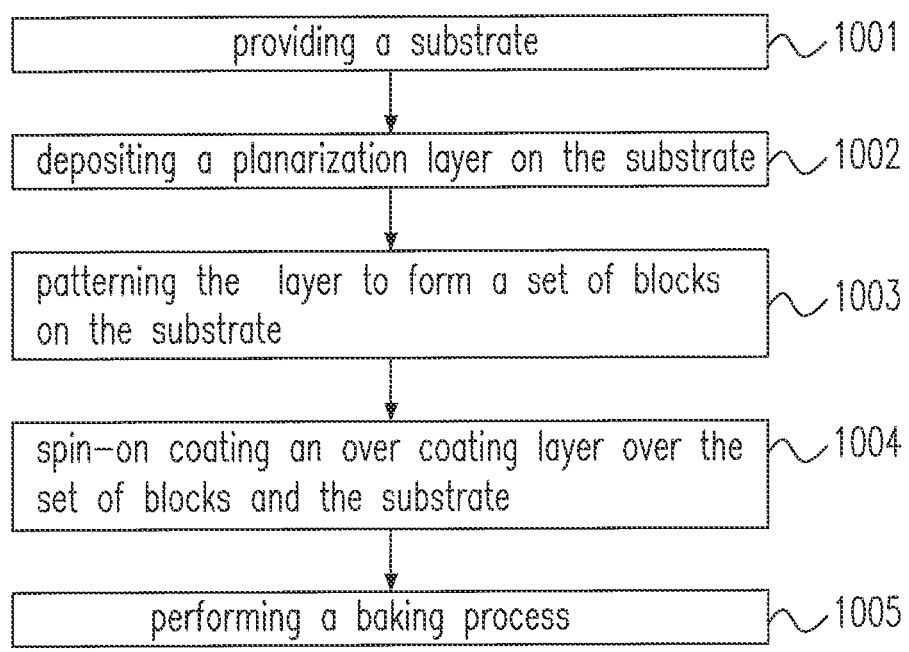
FIG. 25 is a flow chart illustrating the semiconductor fabricating process forming a semiconductor structure in accordance with the present disclosure.

To sum up the processes for forming a series of above-mentioned transition structures of a semiconductor structure, a semiconductor fabricating process can be accordingly provided. Referring now to FIG. 25, which is a flow chart illustrating the semiconductor fabricating process forming a semiconductor structure in accordance with the present disclosure.

The step 1001 is to provide a substrate. The step 1002 is to deposit a layer on the substrate. The step 1003 is to pattern the layer to form a set of block structures on the substrate. The step 1004 is to perform a spin-on coating scheme to form an over coating layer over the set of block structures and the substrate. The step 1005 is to perform a baking process.

There are further embodiments provided as follows.

Embodiment 1: In a fabricating process for fabricating an optical element, the process includes forming a substrate, a set of block structures and an over coating layer. The set of block strucutres is formed on the substrate. The over coating layer is formed over the set of block structures and the substrate by a deposition scheme.

Embodiment 2: In the process according to above-mentioned embodiment, the optical element is one of a microlens and a waveguide Embodiment 3: In the process according to above-mentioned embodiment 1 or 2, the deposition scheme is one selected from a group consisting of a spin-on coating scheme, an atomic layer deposition scheme and a vapor-based deposition scheme.

Embodiment 4: In the process according to any one of the above-mentioned embodiments 1-3, the providing step further includes a photolithography process and an etching process. One of the photolithography process and the etching process is performed to form a structure on the substrate to serve as the protrusion.

Embodiment 5: In the process according to any one of the above-mentioned embodiments 1-4, the over coating layer further includes a material. The material is one selected from a group consisting of a microlens material, a color filter material and a waveguide material.

Embodiment 6: In the process according to any one of the above-mentioned embodiments 1-5, the substrate further includes a material. The substrate is one selected from a group consisting of a cladding, a printed circuit board, a mirror, a under bump metallurgy, a glass, a resin, a semiconductor wafer and a color filter.

Embodiment 7: In the process according to any one of the above-mentioned embodiments 1-6, the set of block structures further includes a material. The material is one selected from a group consisting of an allyic resin, an acrylic resin, an epoxy resin, a benzocyclobutene, a fluoropolyimide, an $SiO_xN_y$ and a spin-on-dielectric material.

Embodiment 8: In the process according to any one of the above-mentioned embodiments 1-7, the set of block structures has a density parameter, the deposition scheme has a spin-speed parameter, the over coating layer has a viscosity parameter and an interfacial property parameter with respect to the set of block structures.

Embodiment 9: In the process according to any one of the above-mentioned embodiments 1-8, the process further includes a step of performing a baking process.

Embodiment 10: In the process according to any one of the above-mentioned embodiments 1-9, the waveguide is an integral whole converging light.

Embodiment 11: In the process according to any one of the above-mentioned embodiments 1-10, the set of block structures and the over coating layer has the same material.

Embodiment 12: An optical element structure includes a substrate, a set of block structures and a curved layer. The set of block structures is formed on the substrate. The curved layer is formed over the set of block structures and the substrate.

Embodiment 13: In the structure according to above-mentioned embodiment, the set of block structures have identical aspect ratios.

Embodiment 14: In the structure according to any one of the above-mentioned embodiment 12 or 13, the structure further includes a spacing. The spacing is between two adjacent block structures of the set of block structures.

Embodiment 15: In the structure according to any one of the above-mentioned embodiments 12-14, the curved layer has a convex portion and a concave portion. The convex and the concave portions have respective radii of curvature respectively.

Embodiment 16: In the structure according to any one of the above-mentioned embodiments 12-15, the set of block structures have descending aspect ratios.

Embodiment 17: In the structure according to any one of the above-mentioned embodiments 12-16, the structure further includes a tapered shape with a slope measured in 20 degrees.

Embodiment 18: In the structure according to any one of the above-mentioned embodiments 12-17, the structure further includes a refractive index of the set of block structures with respect to the curved layer.

Embodiment 19: In the structure according to any one of the above-mentioned embodiments 12-18, the refractive index is less than 0.3 and measured at a wavelength being in a range from 300 nm to 800 nm.

Embodiment 20: An optical element structure includes a substrate, a protrusion and an over coating layer. The protrusion is formed on the substrate. The over coating layer is formed over the protrusion and the substrate.

While the disclosure has been described in terms of what are presently considered to be the most practical and preferred embodiments, it is to be understood that the disclosure need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An optical element fabricating process, comprising:
providing a substrate forming thereon a block structure having a width, a height, and a controllable aspect ratio, wherein the controllable aspect ratio is a ratio of the width to the height; and
forming an over coating layer over the block structure and the substrate by a spin-on coating scheme to form an optical element according to the aspect ratio, wherein the over coating layer wraps the block structure and has a convex portion on top of the block structure.

2. The process according to claim 1, wherein the forming step further comprises performing a deposition scheme being one of an atomic layer deposition scheme and a vapor-based deposition scheme.

3. The process according to claim 1, wherein the over coating layer further comprises a material being one selected from a group consisting of a microlens material, a color filter material and a waveguide material.

4. The process according to claim 1, wherein the substrate further comprises one selected from a group consisting of a cladding, a printed circuit board, a mirror, an under bump metallurgy, a glass, a resin, a semiconductor wafer and a color filter.

5. The process according to claim 1, wherein the block structure further comprises a material being one selected from a group consisting of an allyic resin, an acrylic resin, an epoxy resin, a benzocyclobutene, a fluoropolyimide, an $SiO_xN_y$, and a spin-on-dielectric material.

6. The process according to claim 1, wherein the block structure has a density parameter, the deposition scheme has a spin-speed parameter, the over coating layer has a viscosity parameter and an interfacial property parameter with respect to the block structure.

7. The process according to claim 1, wherein the block structure and the over coating layer comprise the same material.

8. The process according to claim 1, wherein the optical element is one of a microlens and a waveguide.

9. The process according to claim 8, wherein the waveguide is an integral whole converging light.

10. The process according to claim 1, wherein the providing step further comprises performing one of a photolithography process and an etching process to form the block structure on the substrate.

11. The process according to claim 10, further comprising a step of performing a baking process.

12. An optical element structure, comprising:
a substrate;
a set of block structures formed on the substrate; and
a curved layer formed over at least one of the set of block structures and the substrate, wherein the at least one block structure is wrapped by the curved layer.

13. The structure according to claim 12, wherein the set of block structures have identical aspect ratios.

14. The structure according to claim 12, further comprising a spacing between two adjacent block structures of the set of block structures.

15. The structure according to claim 12, wherein the curved layer has a convex portion and a concave portion, and the convex and the concave portions have respective radii of curvature respectively.

16. The structure according to claim 12, wherein the set of block structures have descending aspect ratios.

17. The structure according to claim 16, further comprising a tapered shape with a slope measured in 20 degrees.

18. The structure according to claim 12, further comprising a refractive index of the set of block structures with respect to the curved layer.

19. The structure according to claim 18, wherein the refractive index is less than 0.3 and measured at a wavelength being in a range from 300 nm to 800 nm.

20. An optical element structure, comprising:
a substrate;
a cubic protrusion formed on the substrate; and
an over coating layer formed over the cubic protrusion and the substrate to form the optical element structure, wherein the cubic protrusion is wrapped by the over coating layer.

* * * * *